United States Patent [19]
Bishop et al.

[11] Patent Number: 5,768,059
[45] Date of Patent: *Jun. 16, 1998

[54] HEAD LOAD/UNLOAD AND CLEANING IN A DATA STORAGE DEVICE

[75] Inventors: Ross W. Bishop, Ogden; Allen T. Bracken, Layton; John C. Briggs, Layton; David W. Griffith, Layton; David E. Jones, Layton; Carl F. Nicklos; Robert S. Patterson, both of Ogden; Ralph L. Sonderegger, Farmington, all of Utah

[73] Assignee: Iomega Corporation, Roy, Utah

[*] Notice: The term of this patent shall not extend beyond the expiration date of Pat. No. 5,530,607.

[21] Appl. No.: 710,638

[22] Filed: Sep. 18, 1996

Related U.S. Application Data

[63] Continuation of Ser. No. 324,895, Oct. 18, 1994, abandoned.

[51] Int. Cl.$^6$ .................................. G11B 5/54; G11B 5/41
[52] U.S. Cl. ........................................... 360/105; 360/128
[58] Field of Search .................................. 360/128, 105, 360/104, 106

[56] References Cited

U.S. PATENT DOCUMENTS

| | | | |
|---|---|---|---|
| 4,302,789 | 11/1981 | Vos | 360/105 |
| 4,504,879 | 3/1985 | Toldi et al. | 360/105 |
| 4,528,607 | 7/1985 | Thompson | 360/105 |
| 4,663,677 | 5/1987 | Griffith et al. | 360/71 |
| 4,663,682 | 5/1987 | McNeil | 360/105 |
| 4,663,686 | 5/1987 | Freeman et al. | 360/128 |
| 4,683,506 | 7/1987 | Toldi et al. | 360/105 |
| 4,722,012 | 1/1988 | Toldi et al. | 360/99.07 |
| 4,740,851 | 4/1988 | Jones et al. | 360/99.08 |
| 4,742,409 | 5/1988 | Koyahara et al. | 360/105 |
| 4,787,000 | 11/1988 | Schulze | 360/105 |
| 4,811,143 | 3/1989 | Ohashi et al. | 360/105 |
| 4,901,173 | 2/1990 | Jones et al. | 360/99.04 |
| 4,965,685 | 10/1990 | Thompson et al. | 360/97.01 |
| 5,012,370 | 4/1991 | Hikichi et al. | 360/105 |
| 5,027,241 | 6/1991 | Hatch et al. | 360/105 |
| 5,189,575 | 2/1993 | Onooka et al. | 360/105 |
| 5,219,359 | 6/1993 | Wolter | 360/105 |
| 5,237,472 | 8/1993 | Morehouse et al. | 360/105 |
| 5,237,477 | 8/1993 | Hodapp et al. | 360/128 |
| 5,267,227 | 11/1993 | Nanke | 369/77.1 |
| 5,467,238 | 11/1995 | Lee et al. | 360/128 |
| 5,530,607 | 6/1996 | Spendlove | 360/105 |

FOREIGN PATENT DOCUMENTS

| | | | |
|---|---|---|---|
| 0108500 | 5/1984 | European Pat. Off. | 360/105 |
| 53-020907 | 2/1978 | Japan | 360/105 |
| 58-147817 | 9/1983 | Japan . | |
| 62-88124 | 4/1987 | Japan . | |
| WO 93/18507 | 9/1993 | WIPO . | |

OTHER PUBLICATIONS

"An Introduction to the Insite 325 Floptical Disk Drive," Jim Godwin, SPIE vol. 1078, pp. 71–79, presented at Spie Optical Data Storage Topical Meeting (1989).

"Personal Technology" column from *Wall Street Journal*, Apr. 6, 1995 (this article is not prior art).

"Product Comparision—Iomega Adds Zip to the Storage Market", *Infoworld*, Apr. 10, 1995, p. 64 (this article is not prior art).

*Primary Examiner*—Craig A. Renner
*Attorney, Agent, or Firm*—Woodcock Washburn Kurtz Mackiewicz & Norris LLP

[57] ABSTRACT

In a magnetic disk drive heads are loaded and unloaded onto the magnetic disk by wings attached in close proximity to the magnetic heads. The wings ride on opposed profiles to separate the heads so that they can travel on either side of the disk and the heads are then brought together properly onto the disk. As the heads are withdrawn from the disk, they are separated by the opposed profiles and then the heads are parked on a cleaning pad.

10 Claims, 5 Drawing Sheets

HEAD LOAD/UNLOAD AND CLEANING IN A DATA STORAGE DEVICE

This a continuation, of application Ser. No. 08/324,895, filed Oct. 18, 1994.

RELATED APPLICATIONS

"Actuator For Data Storage Device," Jones, et al, Ser. No. 08324,599, (Attorney's Docket No. IOM-8908) is incorporated herein by reference.

BACKGROUND OF THE INVENTION

This invention relates to an actuator for carrying read/write heads into engagement with a recording medium and more particularly, to the loading, unloading and cleaning of heads.

U.S. Pat. Nos. 4,740,851 Jones, et al and 4,663,677 Griffith, et al show removable media magnetic disk drives of the type made by the assignee of the present ivention. A cartridge having a flexible recording medium is inserted into the disk drive. A motor rotates the disk which is engaged by magnetic read/write heads.

Out of plane flexible disk edge stability and flutter, as well as variations due to assembly tolerances, cause difficulty in loading and unloading a pair of opposing heads on to or off of a disk. Loading and unloading generally needs a large amount of vertical displacement of the heads in order to avoid damaging the heads on the edge of the spinning and fluttering disk. Also, reduction in the preload of the heads can occur as the heads are loaded and unloaded at large vertical displacements.

In floppy disk drives, the cleaning of the magnetic heads is usually accomplished by using a cleaning medium which is rotated in the same manner that the normal data disk is rotated. In rigid disk drives the cleaning material can be accurately located so that it contacts the magnetic head. In floppy disk drives, the head normally contacts the disk so that the cleaning material can merely be substituted for the disk data.

Disk drives of the type described in the aforementioned patents have an automatic head cleaning feature. U.S. Pat. No. 4,663,686 Freeman, et al describes a head cleaning cartridge for a removable media magnetic disk drive.

It is an object of the present invention to provide an improved mechanism for loading and unloading the heads on the magnetic medium and for cleaning the magnetic heads.

SUMMARY OF THE INVENTION

In accordance with the present invention, the position of the magnetic heads with respect to the disk is carefully controlled during the loading and unloading of the heads. Head loading and unloading is accomplished in a more efficient displacement, thus assuring that the heads will not be destroyed during the load/unload process. By reducing the vertical displacement, more heads and more disks can act in the same vertical height, thereby allowing more data storage capacity in the same form factor or volume.

In accordance with the invention, wings have been added to the heads to act as lifters which control the vertical position of the heads. The wings are in close proximity to the heads to fully ensure that the motion of the wing is the motion of the heads.

The wings ride on opposed profiles as the actuator carriage moves toward and away from the disk. As the heads move toward the disk, first opposed profiles separate the heads so that the heads can pass on both sides of the disk. Further travel of the actuator causes the wings to ride over second opposed profiles which bring the heads together onto the disk in a controlled manner.

As the actuator is withdrawn away from the disk, the wings ride up on the opposed profiles to again separate the heads. Further retraction of the actuator moves the heads away from the disk and down the first opposed profiles. This brings the heads together onto a cleaning medium. The heads come to rest on the cleaning medium and slide for a short distance which cleans the heads while they are out of contact with the disk.

When not operating, the heads are parked on the cleaning medium, not parked in the air as in much of the prior art. This prevents damage from shock or vibration.

The foregoing and other objects, features and advantages of the invention will be better understood from the following more detailed description and appended claims.

SHORT DESCRIPTION OF THE DRAWINGS

DESCRIPTION OF THE PREFERRED EMBODIMENT

Figure 1:
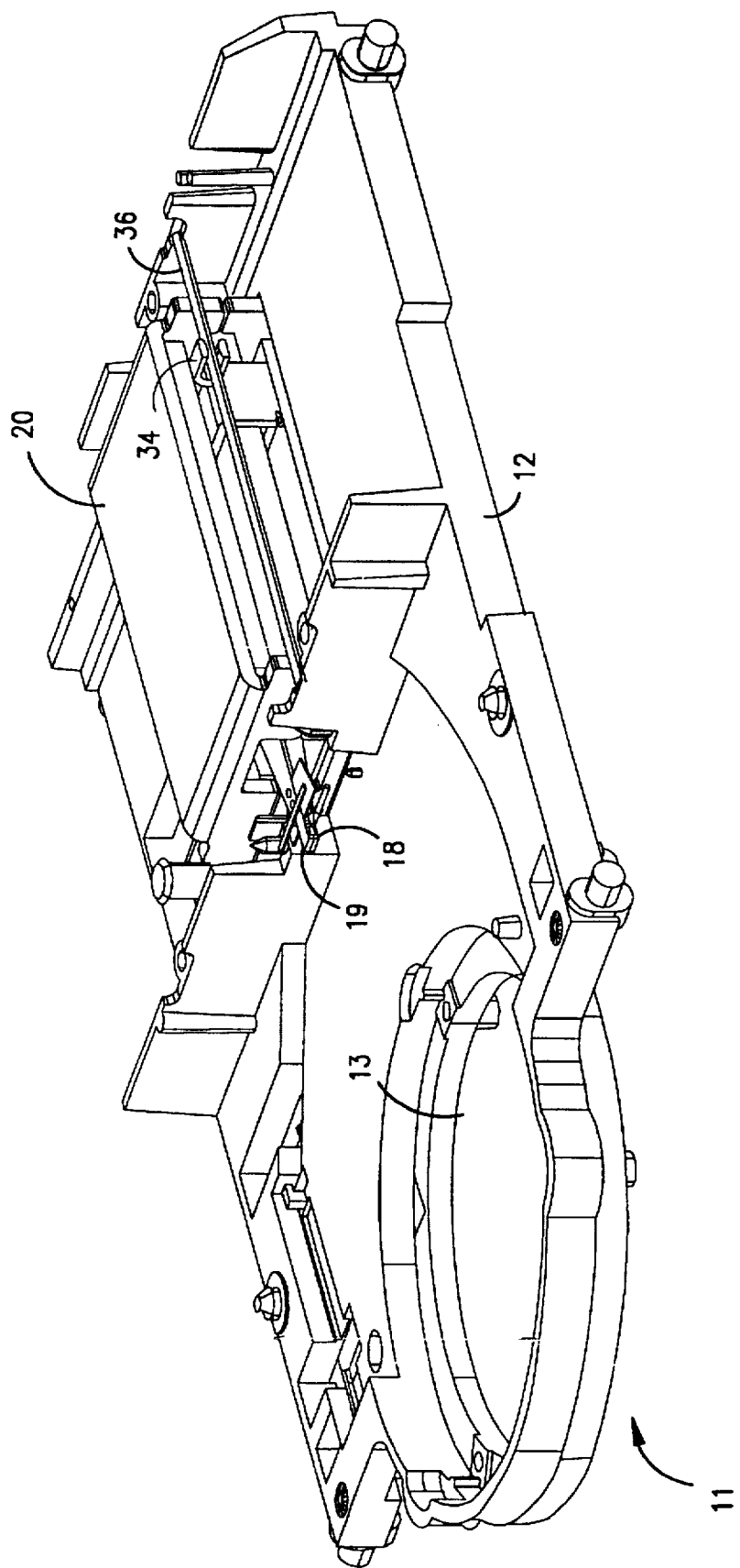
FIG. 1 shows the disk drive of the present invention with the cover removed.
Figure 1A:
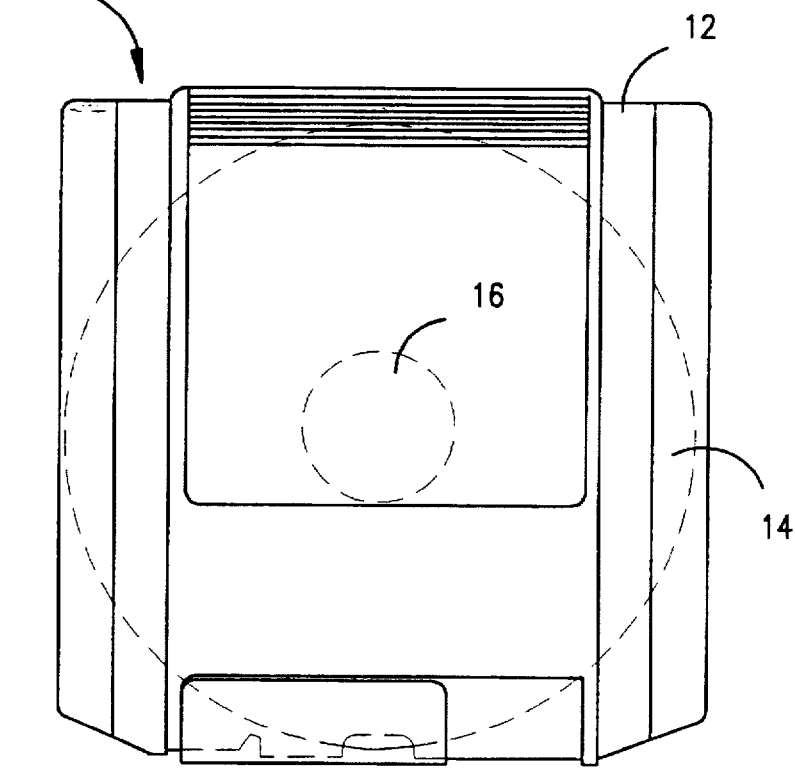
FIG. 1A shows a cartridge of the type used in such a disk drive.

FIG. 1 shows a disk drive of the type in which a cartridge 10 (FIG. 1A) containing a recording media 14 is used. The cartridge is inserted into the drive at 11. A motor is mounted on platform 12 at 13. The motor rotates the flexible disk in the cartridge. The cartridge shown in FIG. 1A has a disk 14 with a hub 16 rotatably mounted therein to be rotated by the motor.

The disk is engaged by opposed read/write heads 18 and 19 which are carried by the actuator. Opposed heads engage both sides of the disk.

Figure 4:
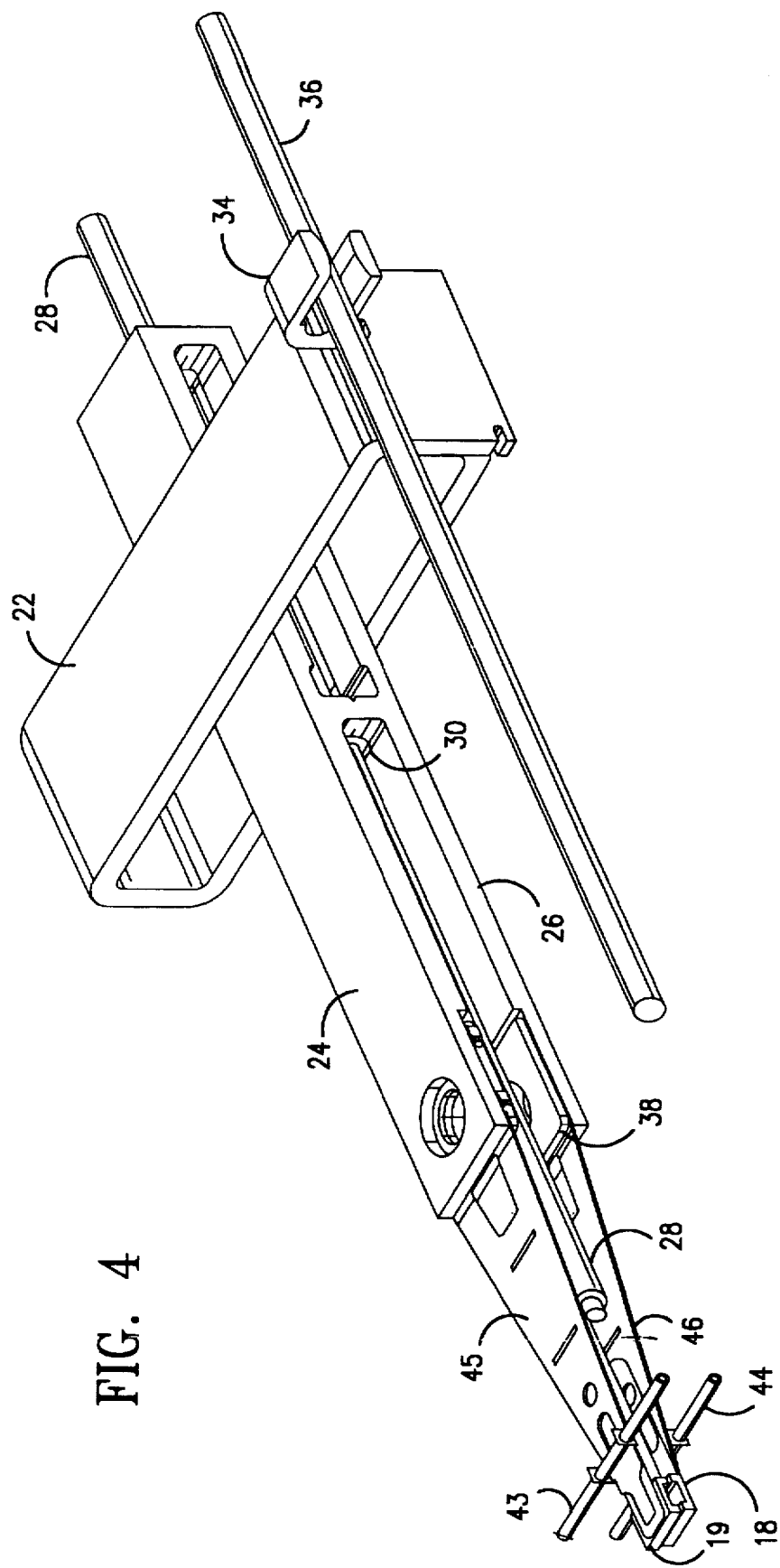
FIG. 4 shows the carriage in more detail.

The voice coil motor for driving the carriage into and out of engagement of the heads with the recording medium includes an outer return path member 20. A coil 22 (FIG. 2) is mounted on the carriage assembly. When the coil 22 is energized, it interacts with the magnets to move the carriage linearly so that the heads 18 and 19 engage concentric tracks on the disk. The carriage includes two lightweight arms 24 and 26. The carriage travels on a central guide track 28 which is a cylindrical member, a small wire guide in the preferred embodiment. The carriage has two bushings through which the cylindrical guide track passes. (Bushing 30 is shown in FIG. 4).

Figure 3:
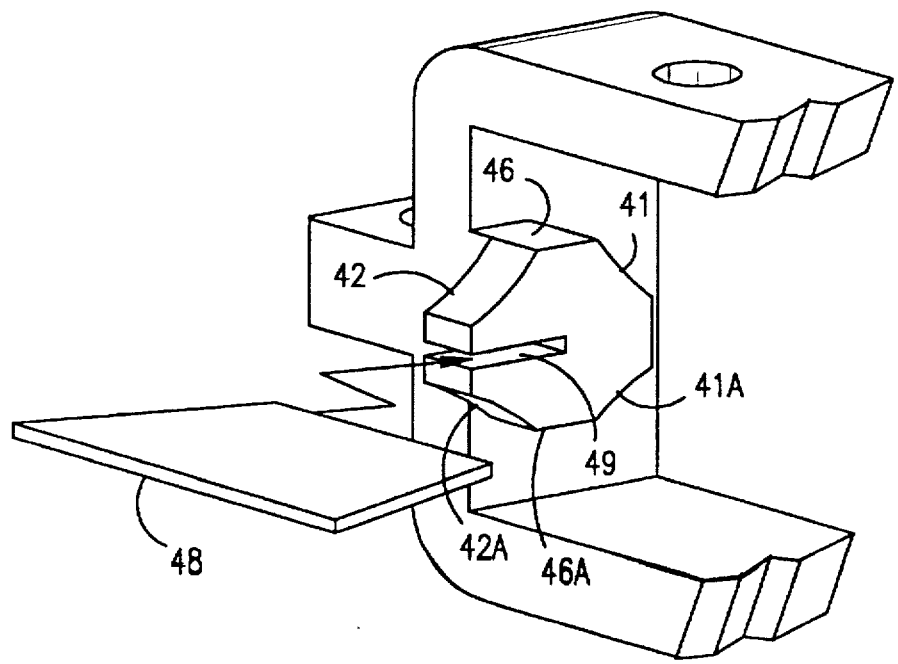
FIG. 3 shows the head cleaner.
Figure 2:
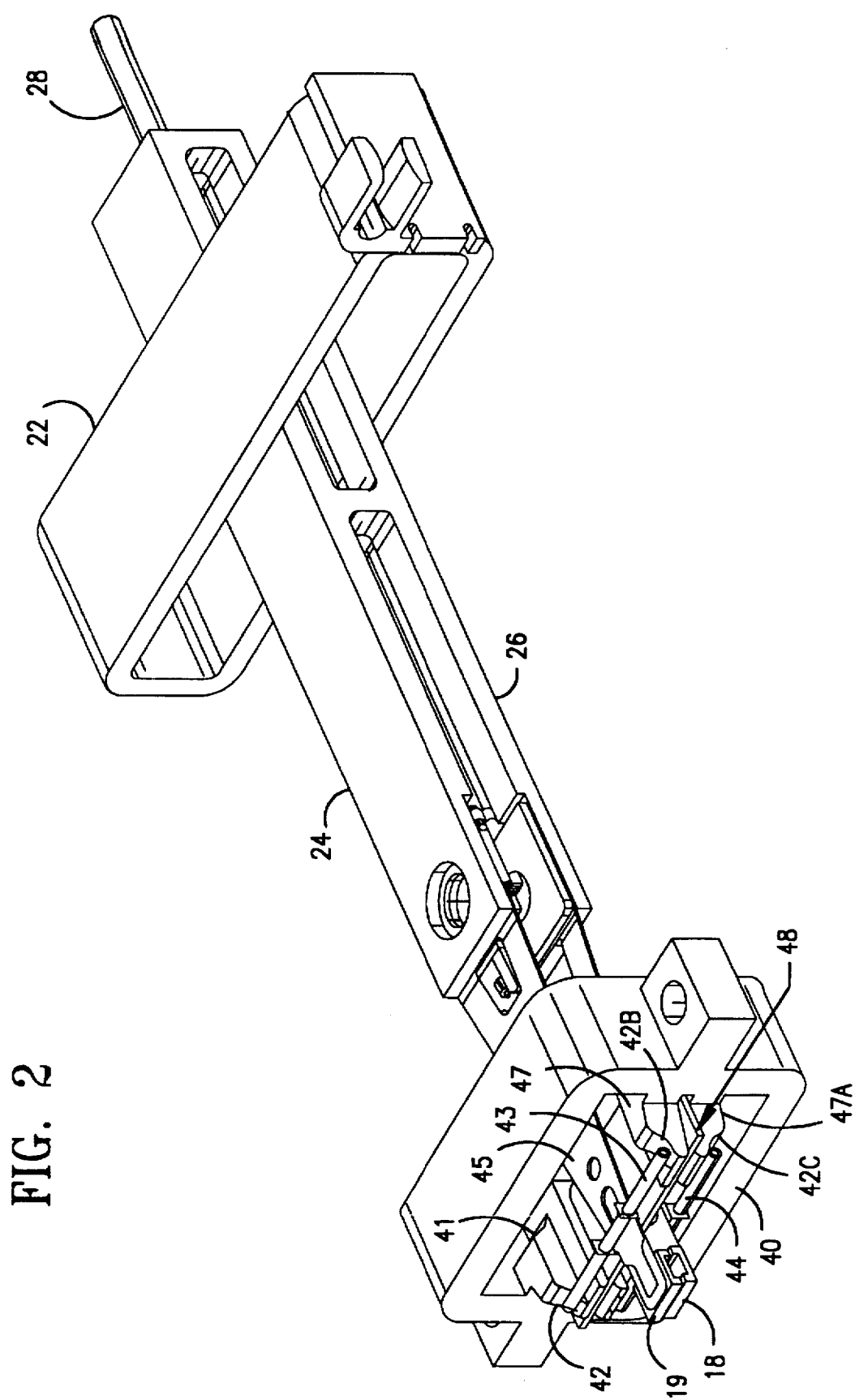
FIG. 2 shows the head loading/unloading mechanism of the present invention.
Figure 5:
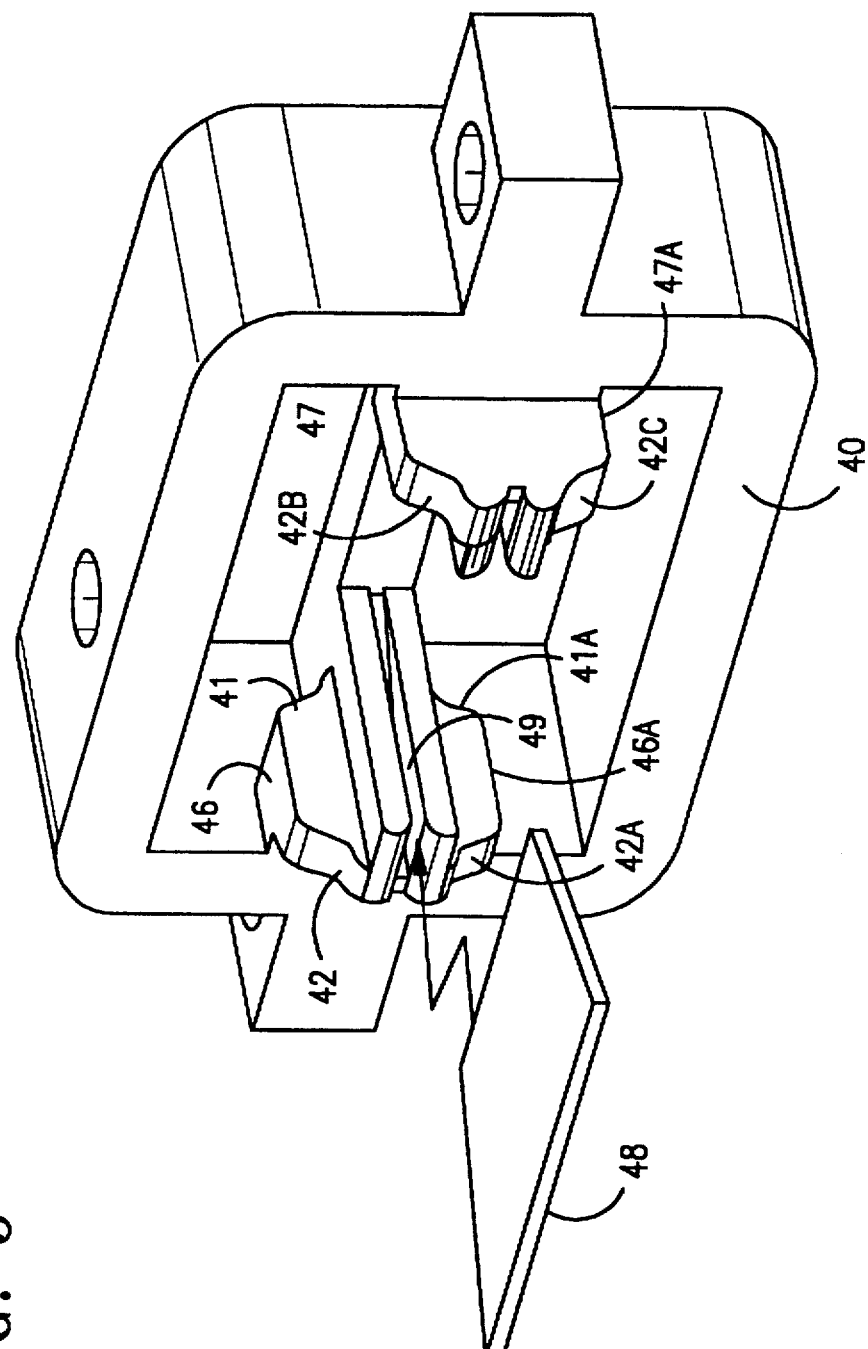
FIG. 5 shows a close-up of the head cleaning device.

In accordance with the present invention, the head load/unload device 40 is provided. It includes first opposed profiles 41 and 41A. In FIGS. 2 and 3, a set of complementary profiles on the other side of the suspension arm are not show. Second opposed profiles 42 and 42A and complementary profiles 42B and 42C are provided. A typical profile is shown in FIG. 5. It has an arcuate contour which sets the heads down carefully on the disk or on the cleaning medium.

Wings 43 and 44 ride on the opposed profiles as the actuator carriage travels toward and away from the magnetic disk. In accordance with the preferred embodiment of the invention, the wings 43 and 44 are rods which are attached to the suspension arms 45 and 45A. Magnetic heads 18 and 19 are flexibly mounted on the suspension arms 45 and 45A (FIG. 4). This flexible mounting biases the heads toward each other. In FIGS. 2 and 4, the heads are shown biased together in the position in which they would engage opposite sides of the magnetic disk.

From the position shown in FIG. 2, as the actuator is retracted, the wings ride up on the second opposed profiles, or cam surfaces, 42, 42A, 42B, 42C to separate the heads. This unloads the heads from the disk surface. Further travel of the actuator away from the disk causes the wings 43 and 44 to ride on the plateau surfaces 46, 46A, 47 and 47A. During continued travel of the actuator away from the disk, the wings ride down the second opposed profiles 41, 41A and the complementary set. This brings the heads together onto the cleaning medium, or pad, 48. The cleaning pad 48 is located in the slot 49 in the head load/unload device 40. The heads are parked on the cleaning medium 48. The contour of profiles 41, 41A slides the heads along the cleaning pad 48 to clean the heads. During travel in the opposite direction, the contour of the profiles 42, 42A, 42B and 42C sets the heads down on the disk in a carefully controlled manner.

The end 50 of guide track 28 is mounted directly to the head load/unload device 40. This provides precise positioning of the heads relative to cleaning pad 48.

While a particular embodiment of the invention has been shown and described, various modifications are within the true spirit and scope of the invention. The appended claims are, therefore, intended to cover all such modifications.

What is claimed is:

1. An actuator for carrying opposed read/write heads into engagement with both sides of a recording medium comprising:

a carriage assembly, said opposed heads having flexible mounting on said carriage assembly, said flexible mounting biasing said heads toward each other;

wings mounted in proximity to said heads;

a head load/unload device having first opposed profiles, said first opposed profiles including first and second surfaces extending toward each other in the direction away from said recording medium, said wings riding on said first opposed profiles to separate said heads as said carriage assembly moves toward said recording medium, said head load/unload device having second opposed profiles, said second opposed profiles including third and fourth surfaces extending toward each other in the direction toward said recording medium, said wings riding on said second opposed profiles to bring said heads toward one another;

a cleaning medium between said first and second opposed profiles, said wings riding on said first opposed profiles to bring said heads into contact with said cleaning medium as said heads are withdrawn away from said disk; and a central guide track on which said carriage assembly travels linearly, one end of said central guide track being mounted to said head load/unload device to support said central guide track so that said heads are precisely positioned with respect to said recording medium and said cleaning medium.

2. The actuator recited in claim 1, wherein said first and second surfaces bring said heads together on said cleaning medium and permit said heads to slide on said cleaning medium.

3. The actuator recited in claim 1, wherein said first and second surfaces are cam surfaces extending toward each other in the direction away from said recording medium and wherein said third and fourth surfaces are cam surfaces extending toward each other in the direction toward said recording medium.

4. The actuator recited in claim 3, wherein each wing includes a rod, said rods riding on one of said cam surfaces.

5. The actuator recited in claim 1, wherein said first, second, third, and fourth surfaces are on one side of said heads and complementary surfaces for each of said opposed profiles are on the other side of said heads.

6. The actuator recited in claim 1, wherein said third and fourth surfaces are arcuate surfaces which bring said heads toward one another onto the surfaces of said recording medium in a controlled manner.

7. An actuator for carrying opposed read/write heads into engagement with both sides of a recording medium comprising:

a carriage assembly, said opposed heads having flexible mounting on said carriage assembly, said flexible mounting biasing said heads toward each other;

wings mounted in proximity to said heads;

a head load/unload device having first opposed profiles, said wings riding on said first opposed profiles to bring said heads toward one another as said carriage assembly moves toward said recording medium, said first opposed profiles being arcuate surfaces which bring said heads toward one another onto the surfaces of the recording medium in a controlled manner as said carriage assembly moves toward said recording medium, said head load/unload device having second opposed profiles, said wings riding on said second opposed profiles to separate said heads as said carriage assembly moves toward said recording medium;

a cleaning medium between said first and second opposed profiles, said wings riding on said second opposed profiles to bring said heads into contact with said cleaning medium as said heads are withdrawn away from said disk; and a central guide track on which said carriage assembly travels linearly, one end of said central guide track being mounted to said head load/unload device to support said central guide track so that said heads are precisely positioned with respect to said recording medium and said cleaning medium.

8. The actuator recited in claim 7, wherein said arcuate surfaces extend toward each other in the direction toward said recording medium.

9. The actuator recited in claim 7, wherein each wing includes a rod, each said rod riding on a respective one of said arcuate surfaces.

10. The actuator recited in claim 7, wherein said arcuate surfaces are on one side of said heads and complementary arcuate surfaces are on the other side of said heads.

* * * * *